April 9, 1946.  G. A. JAEDIKER  2,398,143
PROTRACTOR FOR ISOMETRIC DRAWINGS
Filed Sept. 14, 1943  2 Sheets-Sheet 1
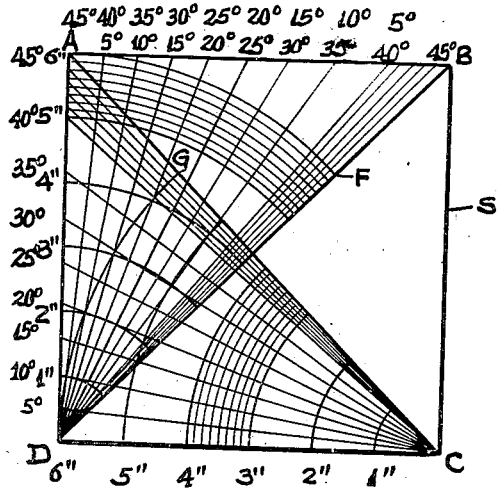
Fig. 1.
Fig. 6.
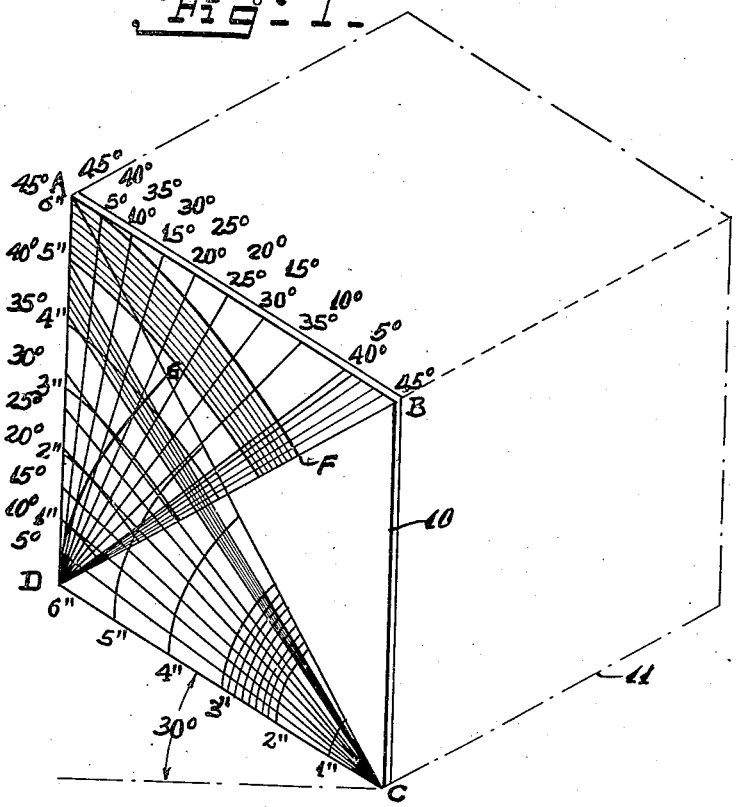
Fig. 2.
INVENTOR.
George A. Jaediker
BY
Zoltan H. Polachek
ATTORNEY April 9, 1946.　　　G. A. JAEDIKER　　　2,398,143
PROTRACTOR FOR ISOMETRIC DRAWINGS
Filed Sept. 14, 1943　　2 Sheets-Sheet 2

INVENTOR.
George A. Jaediker
BY
ATTORNEY

Patented Apr. 9, 1946

2,398,143

UNITED STATES PATENT OFFICE 2,398,143

PROTRACTOR FOR ISOMETRIC DRAWINGS

George A. Jaediker, Rego Park, N. Y.

Application September 14, 1943, Serial No. 502,238

3 Claims. (Cl. 33—104)

This invention relates to new and useful improvements in protractors, and has more particular reference to protractors for assisting in making isometric drawings.

More particularly, the invention proposes to characterize the new protractor by the fact that it includes a sheet-like body having a point from which a plurality of straight lines radiate, these lines radiating the isometric angular distances from each other and these lines being divided by a plurality of arcuate lines concentric with said point and dividing off isometric radial distances along said straight lines. With a protractor of this character it is an easy matter to transfer angles and distances from an orthographic drawing or object measured with a conventional protractor and measuring rule, to make an isometric drawing thereof.

The new protractor may take various forms, and yet embody the dominating features of this invention. Two forms have been disclosed in this specification, and many additional forms are possible. In one of these forms a diamond-shaped protractor is shown in which one or more of the corners thereof are used as the point (or points) previously referred to. This diamond shaped protractor is designed to make isometric drawings on a 30° angle. It is pointed out that other protractors may be easily designed using different angles. In another form of this invention the new isometric protractor is of elliptical shape. It has a central point which comprises the point previously referred to. With this arrangement angular distances of 360° around this point may be laid out.

The invention furthermore contemplates the association of elements with the isometric protractors to make their use more convenient.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a schematic plan view of an orthographic projection layout or protractor, which forms no part of this invention, but which may be used in conjunction with an isometric protractor in accordance with this invention.

Fig. 2 is a perspective view of an isometric protractor corresponding with the orthographic layout or protractor shown in Fig. 1.

Fig. 6 is a sectional view taken on the line 6—6 of Fig. 5.

Figure 3:
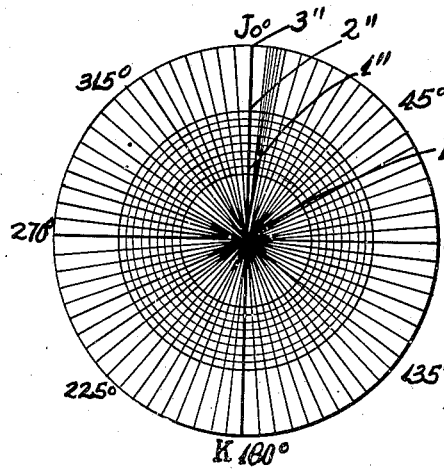
Fig. 3 is a schematic plan view of an orthographic layout or protractor, which forms no part of this invention, but which is used in conjunction with a complementary isometric protractor constructed in accordance with this invention.

In Fig. 2 one form of the new isometric protractor has been disclosed. However, this article may be better understood by first considering the orthographic layout or protractor disclosed in Fig. 1. In this layout we start with a square S the corners of which we indicated by the letters A, B, C and D. A straight line is then drawn from the corner D to the corner B. Using the corner D as a center an arc F is swung from corner A up to this line DB. With a protractor or other angle measuring device we then lay out angles from zero to 45° along the arc AF using D as a center. Radial lines are then drawn from the point D through the marked off arc AF. These radial lines form angles which are indicated along the top edge of the square S, or in any other manner. Preferably, every 5° should be a black or heavy line, and the other lines should be finer or lighter colored lines. We next divide the line DF into inches, or half inches, and fractional parts thereof, preferably sixteenths. Using the point D as a center we swing arcs and indicate these arcs along the side of the layout or square S by the inches or fractional parts thereof they represent. Each inch or half inch may be made with heavy lines, while the sixteenths of an inch fractions are lighter lines. For clarity in illustrating the construction only certain of the lines representing the one-sixteenths of an inch and only certain of the lines representing 1° have been shown on the drawings; the rest have been omitted. It should be borne in mind that all of the various lines should be drawn and completed in the commercial protractor.

Starting from the point C we draw a straight line to the point A. Then an arc is swung using the point C as a center and starting from the point D to the line AC, so we arrive at the point G. The 45° bottom angle thus constructed is now divided with 5° lines, which in turn are subdivided into 1° lines. These angles are indicated along one side of the layout or square S. Arcs are then swung from the point C at the one inch, two inch, etc. distances and noted along the bottom of the layout, and these distances are subdivided into sixteenths of an inch.

This device may be used as a protector for assisting in the making of isometric drawings, perspectives as well as cabinet projections.

The disclosure of Fig. 1 is in the nature of an orthographic layout or protractor and forms no part of the invention. However, from this layout or protractor we are now ready to lay out an isometric protractor, such as illustrated in Fig. 2. In Fig. 2 an isometric protractor is shown in which the bottom edge is disposed at an angle of 30° from the horizontal. The various orthographic projections disclosed in Fig. 1 are then projected on the isometric projection shown in Fig. 2. The body 10 used for this protractor preferably is of transparent sheet material, though this is not necessary. When opaque material is used, it is advisable that identical lines be printed or formed on both faces thereof. The dot and dash lines, indicated by reference numeral 11, schematically illustrate a cube in isometric projection, continued from the back face of the isometric protractor 10. The various lines projected on the body 10 have been illustrated and indicated by the angles and distances substantially as disclosed in the layout in Fig. 1. It must be borne in mind that the body 10 comprises a flat sheet and is substantially of diamond shape. It is placed so that the two sides are vertical and the top and bottom edges are disposed at a 30° angle. However, different isometric protractors may be constructed with isometric projections of other angles, for example, 15° or 45°, or other selected angles.

Figure 4:
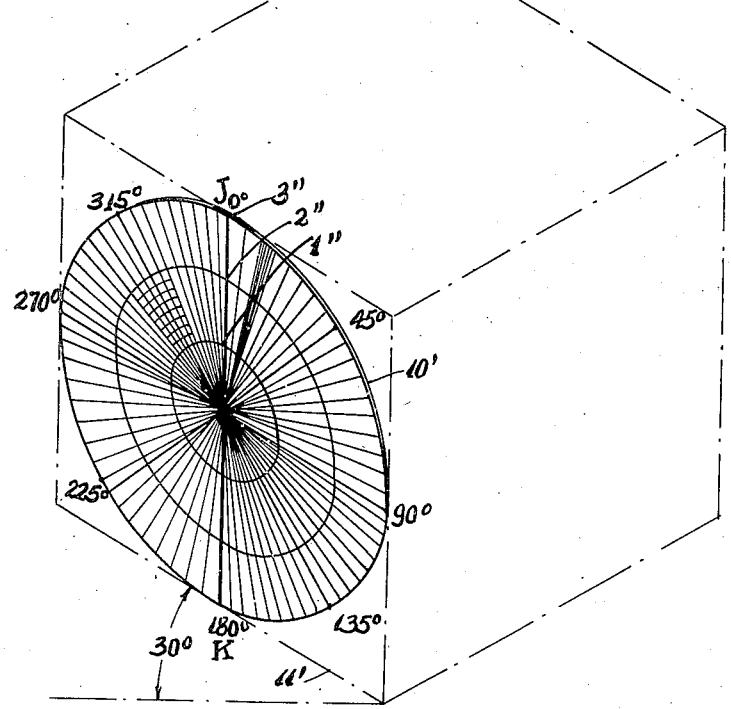
Fig. 4 is a perspective view of an isometric protractor constructed in accordance with this invention and which corresponds with the layout or protractor shown in Fig. 3.

In Figs. 3 and 4 a modification of the first form of the invention has been disclosed. In Fig. 3 there is disclosed an orthographic layout or protractor having a central point H through which a vertical line JK passes. From this center H a plurality of radial lines are laid off, preferably in groups of 5° each, indicated by heavy lines, which are subdivided by fine lines representing 1° each. A plurality of circles having radii from the point H equal to distances representing inches and fractional parts thereof, are then inscribed about the point H. These inches may be subdivided into sixteenths of an inch. The figure shown in Fig. 3 represents a 300° protractor of more or less standard design and forms no part of the invention.

In Fig. 4 an isometric protractor has been disclosed which was obtained by projecting the orthographic protractor layout shown in Fig. 3 into the face of a theoretical cube 11' having its bottom edge disposed at an angle of 30° from the horizontal. This isometric protractor has the line JK prominently printed with a heavy black line so that we know the vertical direction for properly holding the isometric protractor. This protractor is imprinted on a sheet of material 10', preferably transparent. However, if this sheet material is opaque the identical lines should be printed on both sides.

The theory embodied in the isometric protractors shown in Figs. 2 and 4 is substantially identical. They differ, however, in that the isometric protractor of Fig. 2 has two sections, each extending through an arcuate distance of 45°. The protractor of Fig. 4 extends through 360°. The new isometric protractor is really in the nature of a distortion calculator for projecting the distortion which takes place when an orthographic figure is drawn in isometric.

The isometric protractor shown in Figs. 2 or 4 is used by finding the length from the center point along an isometric axis line (on either isometric protractor), and then following that segment of a circle until it crosses the correct angle line, and so we find the distance from this point to the center of the arcs, with the proper distorted length in relation to the rest of the isometric projection. As we before indicated, these isometric protractors may also be used and projected into cabinet projections and various oblique angles.

Figure 5:
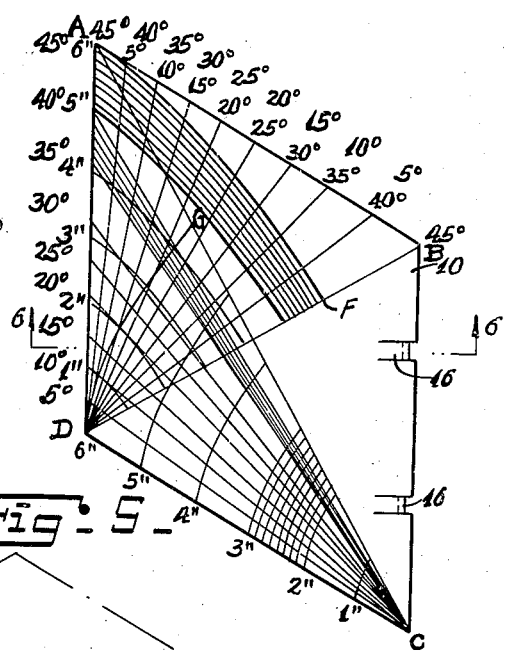
Fig. 5 is a plan view of an isometric protractor constructed in accordance with a modified form of this invention.

In Figs. 5 and 6 another form of the invention is disclosed which is very similar to the first form of the invention, distinguishing merely in the fact that several lugs 16 are cut and stamped from an edge portion of the body 10 of the protractor and are bent downwards and are for the purpose of supporting the edge thereof in a slightly elevated position, as indicated in Fig. 6, when the protractor is rested on a flat surface or board 18. When one side of the protractor is thus lifted, the other side will be rested against the table or flat surface 18 and in this way warping of the protractor body may easily be overcome. When desired, the raised side of the protractor may be forced downwards, which will flatten out the lugs 16 for forcing the entire body of the protractor flat upon the table or board 18. When the pressure is taken off, the lugs 16 will return to their original arched positions.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A protractor for isometric drawings, comprising a transparent sheet-like body having a point, a plurality of straight lines radiating from said point at isometric angular distances from each other, and a plurality of arcuate lines concentric with said point and dividing off isometric radial distances along said straight lines, said body being of diamond shape.

2. A protractor for isometric drawings, comprising a transparent sheet-like body having a point, a plurality of straight lines radiating from said point at isometric angular distances from each other, and a plurality of arcuate lines concentric with said point and dividing off isometric radial distances along said straight lines, said body being of diamond shape, and said group of radiating lines being confined to an over-all angle of 45°.

3. A protractor for isometric drawings, comprising a transparent sheet-like body having a point, a plurality of straight lines radiating from said point at isometric angular distances from each other, and a plurality of arcuate lines concentric with said point and dividing off isometric radial distances along said straight lines, said body being of diamond shape, and said group of radiating lines being confined to an over-all angle of 45°, and another group of straight lines and arcuate lines being inscribed on said body from the other corner of the body portion.

GEORGE A. JAEDIKER.